United States Patent
Inagaki et al.

(10) Patent No.: US 6,348,545 B2
(45) Date of Patent: *Feb. 19, 2002

(54) WATER-ABSORBING RESIN AND MANUFACTURING METHOD

(75) Inventors: Yasuhito Inagaki; Haruo Watanabe; Tsutomu Noguchi, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,495

(22) Filed: Jan. 11, 1999

(30) Foreign Application Priority Data

Jan. 12, 1998 (JP) .......................... 10-004149
Jan. 12, 1998 (JP) .......................... 10-004150
Jan. 12, 1998 (JP) .......................... 10-004151

(51) Int. Cl.$^7$ .............................. C08F 271/00
(52) U.S. Cl. ............... 525/261; 525/262; 525/333.3; 525/336.2; 525/332.4
(58) Field of Search ............... 524/413, 111, 524/310, 543, 572, 431, 439, 430, 434, 432, 469, 441, 100, 329; 525/329.3, 505, 334; 521/40.5; 264/911; 528/487

(56) References Cited

U.S. PATENT DOCUMENTS

| | | | | |
|---|---|---|---|---|
| 3,929,712 A | * | 12/1975 | Hiyama et al. | 260/31.8 |
| 4,112,022 A | * | 9/1978 | Marien et al. | 260/881 |
| 4,170,481 A | * | 10/1979 | Akama et al. | 96/115 |
| 4,417,013 A | * | 11/1983 | Schuster | 524/87 |
| 4,420,588 A | * | 12/1983 | Yoshioka et al. | 525/93 |
| 4,461,865 A | * | 7/1984 | Maeda et al. | 524/440 |
| 4,537,925 A | * | 8/1985 | Luxon | 524/151 |
| 4,582,871 A | * | 4/1986 | Naro | 524/413 |
| 4,615,393 A | * | 10/1986 | Sedillo et al. | 166/308 |
| 4,758,617 A | * | 7/1988 | Tanioku et al. | 524/418 |
| 4,929,652 A | * | 5/1990 | Gugumus | 524/91 |
| 5,635,548 A | * | 6/1997 | Kittle et al. | 523/220 |

* cited by examiner

Primary Examiner—Edward J. Cain
Assistant Examiner—Katarzyna W. Lee
(74) Attorney, Agent, or Firm—Sonnenschein, Nath & Rosenthal

(57) ABSTRACT

A water-absorbing resin having superior water absorption properties, and a method for manufacturing the water-absorbing resin having superior water absorption properties in a short time, in which used waste materials are used for effective utilization of resources. To this end, a high-molecular material containing acrylonitrile, styrene and conjugated dienes as constituent units are processed with acid and/or alkali.

15 Claims, No Drawings

WATER-ABSORBING RESIN AND MANUFACTURING METHOD

BACKGROUND OF THE INVENTION

1. Field of the Invention

This invention relates to a water absorbing resin obtained on modifying a high-molecular material, and a manufacturing method therefor.

2. Description of the Related Art

Among acrylonitrile-containing resins, there are a polystyrene-based resin, exemplified by an acrylonitrile-butadiene-styrene (ABS) resin, a styrene-acrylonitrile (SAN) resin, and an acrylonitrile-acryl-styrene (AAS) resin, and a synthetic rubber of acrylonitrile-butadiene (NBR) rubber. These resins are relatively inexpensive and, in particular, the former resin, that is polystyrene resin, is superior in toughness, dimensional stability and workability, and hence is used as a resin material for casing of an electric appliances or materials for various parts. The latter resin, that is the synthetic rubber, is used as a tube, hose or a variety of shock-absorbing material.

In these circumstances, the high-molecular weight materials are finding a wider field of use and expectations are made for researches towards a product with a higher added value. The products formed of these high-molecular materials yield a large quantity of waste materials with increase in outputs. Recently, waste materials from the high-molecular materials tend to be increased in quantity such that it is nowadays a desideratum to make effective use of the waste materials in keeping with rise in general interest in maintenance of global environment.

The water-absorbing resin is being used in a wide field of use, such as hygienic material, horticultural usage, food servicing, civil engineering, cosmetics and toiletry application, medical application, electronic or paint/adhesives, and is treated as necessaries of life.

The researches into use of the water-absorbing resin for afforestation of deserts are also proceeding briskly.

With increased usage of the high-molecular materials, a demand for the properties required of them is also becoming stringent. That is, simply high water-absorbing properties are not sufficient. In the field of sanitary products, increase in so-called dry-touch and reduction in a leakage ratio are required, while high gelation factor is preferred to water-absorbing factor.

Thus, water-absorbing resins are being developed positively.

Meanwhile, the water-absorbing resin is mainly used for sanitation products, such as paper diaper or physiological articles. In addition, the water-absorbing resin is expected to be used in construction, horticulture, fire extinguisher or sealants, and investigations are going on briskly in these fields.

Under these circumstances, hydrolyzates of polyacrylonitrile or acrylonitrile/styrene copolymers are proposed. However, for these hydrolyzates to be used as water-absorbing resin, nitrile group containing polymers need to be produced. There are also raised problems such as time consuming reaction or insufficient water-absorbing properties of the water-absorbing resin.

Since the water-absorbing resin for horticulture or civil engineering is used outdoors, the water-absorbing resin is required to accommodate hostile conditions, such changes in lighting or temperature.

Also, in keeping up with general interest in upkeep of global environment, needs for water-absorbing resin that can be used for desert afforestation are increasing, so that it has become necessary to furnish these water-absorbing resins at reduced cost and in large quantities.

The waste materials, mainly composed of the high-molecular materials are disposed of in three different methods, that is by land-filling, incineration and re-melting. Of these, land-filling and incineration account for approximately 90%, that is, the waste materials are hardly put to recycling.

For recycling, the waste materials are usually heat-melted and re-molded, although the waste materials that can be disposed by this method are limited to thermoplastic resins. There are, however, a number of problems presented due to thermal deterioration, such as lowering in molecular weight or oxidation of resins, mixing of foreign mater, such as dust and dirt, or mixing of coloring agents, inorganic pigments, as reinforcements, or resins containing powdered metal pigments, thus necessitating color matching. In this manner, recycling of the waste materials by melting on heating has met significant impediments in connection with the processing technique and cost.

SUMMARY OF THE INVENTION

It is therefore an object of the present invention to provide a water-absorbing resin superior in water-absorbing properties in a short time, and a manufacturing method thereof.

It is another object of the present invention to provide a water-absorbing resin that is able to utilize the waste materials effectively, and a manufacturing method thereof.

It is another object of the present invention to provide a water-absorbing resin superior in stability outdoors with lapse of time, and a manufacturing method thereof.

The present invention has been fulfilled on the basis of the above information.

In one aspect, the present invention provides a water-absorbing resin obtained on introducing an ionic group into a high-molecular material containing acrylonitrile, styrene and a conjugated diene as constituent units.

The conjugated dienes form a rubber phase in the high-molecular material and is susceptible to chemical modification. Thus, it is the conjugated dienes that undergo the reaction first of all in processing with an acid and/or an alkali. That is, with the progress in the reaction, the rubber phase of the high-molecular material containing the conjugated dienes is swollen to produce cracks in the surface of the material. The result is that the high-molecular material containing the conjugated dienes becomes porous in its surface due to erosion with the acid and/or alkali to increase the surface area participating in the reaction.

Thus, the reaction of the high-molecular material containing the conjugated dienes is completed in a shorter time due to the increased surface area participating in the reaction. Moreover, the material has superior water-absorbing properties due to increased surface area.

Meanwhile, in order for the conjugated dienes to be more susceptible to reactions, the rubber phase needs to be formed in the high-molecular material. Therefore, the conjugated dienes are desirably contained in the block-copolymerized state in the material.

On processing with acid and/or alkali, hydrophilic amid groups, carboxylic groups or acids thereof are introduced into the acrylonitrile part of the high-molecular material, thus improving the water-absorbing properties of the produced water-absorbing resin.

On acid processing in particular, strong acid groups, such as sulfonic acid groups, are introduced into the styrene part of the high-molecular material, thus improving the water-absorbing effect of the produced water-absorbing resin.

By the above reason, it is desirable that 10 to 50 mol %, preferably 25 to 40 mol %, of acrylonitrile, 30 to 70%, preferably 40 to 60 mol %, of styrene, 5 to 50 mol %, preferably 10 to 30 mol %, of conjugated dienes, be contained as constituent units in the high-molecular material.

In the water-absorbing resin of the first aspect of the present invention, the high-molecular material, as the main starting material, forms a two-phase structure of a rubber phase mainly composed of conjugated dienes and a vitreous phase composed of the styrene part and the acrylonitrile part. Thus, if the resin is processed with an acid and/or an alkali, the vitreous phase is first reacted so that the surface of the material becomes porous to increase the reaction surface to permit the reaction to proceed deep into the vitreous phase of the styrene part or the acrylonitrile part.

By the above reason, in the water-absorbing resin of the first aspect of the present invention, the conjugated dienes operate effectively so that the water-absorbing resin superior in water-absorbing properties can be produced in a shorter time than conventionally.

If the above three constituent units are contained in the above-mentioned pre-set amounts, it is possible for other constituent units to be contained in the material.

These other constituent units include maleic anhydride, itaconic anhydride, α-methylstyrene, (meth)acrylamide, (meth)acrylic acid, (meth)acrylic acid ester (C1 to C10 saturated and unsaturated hydrocarbons), vinyl acetate, vinyl chloride, ethylene, propylene, butylene, vinyl pyrrolidone and vinyl pyridine.

The weight average molecular weight (Mw) of the acrylonitrile-containing waste materials is usually 1000 to 20000000 or 10000 to 1000000. If the molecular weight is less than 1000, water solubility is demonstrated on modification, such that desirable water-absorbing resins cannot be produced. If the molecular weight exceeds 20000000, difficulties are met in modification. However, if the high-molecular material is a waste material, the resin is liable to undergo cross-linking. Therefore, in this case, no limitations are imposed on the molecular weight.

Specifically, acrylonitrile-butadiene-styrene (ABS) resins are preferred as the high-molecular material.

The high-molecular material may be a newly-produced virgin material, or used-up waste material, molded previously for certain predetermined usage, such as half-products from the production process of the starting resin material or molded articles, materials for various components, such as casings used for electric appliances or cars, or buffer materials, such as tubes or hoses. The site of putting the material to disposal may be a factory, a retail store or the production process. The waste materials from the factory or retail stores are preferred to those from households because the former materials are generally of uniform composition.

The high-molecular material may also be alloys with other resins or contain additives, such as pigments, dyes, stabilizers, combustion retardants, plasticizers, fillers or other assistant agents. These other resins may be enumerated by styrene-acrylonitrile (SAN) resins, acrylonitrile-styrene-acrylate (ASA) resins, acrylonitrile-chlorinated polystyrene-styrene (ACS) resins, acrylonitrile-nitrile-styrene (AAS) resins, acrylonitrile-butadiene rubber (NBR), polystyrene, polyphenylene ether, polycarbonate, polyphenylene sulfide, polyethylene terephthalate, polybutylene terephthalate, polyamide (nylon) and polyester. Of these, the SAN resin, ASA resin, AAS resin, NBR, polystyrene, polycarbonate and polyamide (nylon) are preferred.

These other different resins are preferably mixed in an amount of 60 wt % or less based on the entire high-molecular material. If the other resins are contained in an amount exceeding 60 wt %, the reaction of introducing ionic groups into the waste materials tends to be impaired.

In the second aspect, the present invention provides a method for manufacturing a water-absorbing resin including processing a high-molecular material having acrylonitrile, styrene and a conjugated diene as constituent elements with an acid and/or alkali.

In the processing with alkali and/or acid, acrylonitrile in the high-molecular material is converted into amid or carboxylic groups or salts thereof. On the other hand, acidic ion groups are introduced into the styrene part, while hydroxy groups, or salts thereof and acidic ion groups, such as sulfonic acid groups, are introduced.

As the alkalis used for alkali processing, inorganic alkalis are desirable. These inorganic alkalis are enumerated by oxides, hydroxides, carbonates, hydrogen carbonates, acetates, sulfates or phosphates of alkali metals (sodium, lithium or potassium etc) or alkaline earth metals (magnesium or calcium etc).

By reacting the alkalis and the high-molecular material together, the acrylonitrile part and the conjugated diene part undergo hydrolysis, whereby amide or hydroxyl groups are introduced. By adding the alkalis, the carboxylic groups or salts thereof are substituted for amid groups, while hydroxyl salts are substituted for the hydroxyl groups.

As the acids used in acidic processing, inorganic acids are preferred. These inorganic acids may be enumerated by concentrated sulfuric acid, sulfuric anhydride, fuming sulfuric acid, sulfonating agents, such as chlorosulfonic acid, nitric acid, fuming nitric acid, phosphorus chloride and phosphorus oxide. Of these, the sulfuric acid, sulfuric anhydride, fuming sulfuric acid and chlorosulfonic acid, in particular concentrated sulfuric acid of the concentration of not less than 70 wt %, are preferred.

By reacting the inorganic acid with the high-molecular material, the acrylonitrile part is hydrolyzed and thereby modified to amide or carboxylic groups. On the other hand, acidic ion groups, such as sulfonic acid groups, —PO(OH)2, —CH2PO(OH)2 or nitro groups, are introduced into the styrene part of the conjugated diene part.

If sulfonating agents are used in the above-mentioned acid processing, Lewis bases may be concomitantly used. These Lewis bases may be enumerated by alkyl phosphates (triethyl phosphate, trimethyl phosphate or trimethyl phosphate), dioxane, acetic anhydride, ethyl acetate, ethyl palmitate, diethyl ether and thioxane. In the present acidic processing, the amount of addition of the Lewis bases is 1 to 200 mol %, preferably 2 to 100 mol %, to the entire monomer unit in the high-molecular material. If, in the present acidic processing, the amount of addition of the Lewis bases may be enumerated by alkyl phosphate (triethyl phosphate and trimethyl phosphate), dioxane, acetic anhydride, ethyl acetate, ethyl palmitate, diethyl ether and thioxane. In the present acidic processing, the amount of the Lewis bases, used in conjunction, is 1 to 200 mol % and preferably 2 to 100 mol % based on the entire monomer unit in the high-molecular material. If the amount of addition of the Lewis bases is less than the above-mentioned range, gelated products undesirably tend to be produced in the reaction. If the amount of the Lewis bases exceeds the above-mentioned range, the sulfonating reaction undesirably cannot proceed without difficulties.

The charging quantity of the alkali and/or acid, which is affected significantly by the concentration of the alkali or acid, is usually 1 to 500 and preferably 5 to 200 times the weight of the high-molecular material.

If the charging quantity of the alkali and/or acid is too small, the rate of introduction of the ion groups to styrene or conjugated dienes as well as the rate of acrylonitrile hydrolysis is lowered to deteriorate the performance (water-absorbing properties) as the water-absorbing resin. Conversely, if the charging quantity of the alkali and/or acid is excessive, it becomes necessary to wash the excess alkali and/or acid with water for neutralization, which is not meritorious economically or for operation.

The alkali and/or acid may be used alone or in combination. In the latter case, the alkali and/or acid may be mixed or added sequentially. However, the alkali and the acid are not mixed in use. The processing with alkali may be carried out following acidic processing or vice versa. Alternatively, processing with concentrated sulfuric acid may be followed by processing with sulfuric anhydride (acidic processing is followed by acidic processing).

The processing with alkali and/or acid may be performed in the following manner.

(1) Preferably, the concentrated sulfuric acid or chlorosulfonic acid is first added to the high-molecular material followed by addition of one of the sulfuric anhydride or fuming sulfuric acid. By this technique, sulfonic acid groups are introduced into styrene or conjugated diene part in the high-molecular material as a result of addition of one of the concentrated sulfuric acid or the chlorosulfonic acid. If one of the sulfuric anhydride or fuming sulfuric acid is added, the high-molecular material is cross-linked. Thus, with the present technique, a water-absorbing resin having high cross-linking degree can be produced and hence a highly functional aqueous type resin having high shape stability can be produced.

(2) The sulfonic acid groups can be introduced into the high-molecular material by first reacting the sulfonating reaction (sulfuric anhydride, fuming sulfuric acid, chlorosulfonic acid, concentrated sulfuric acid etc) with the high-molecular material in a solvent. Alternatively, carboxylic groups can be introduced into the high-molecular material by adding n-butyl lithium to the solvent and reacting the resulting product with dry ice. Still alternatively, —PO(OH)2 groups can be introduced into the high-molecular material by adding phosphorus trichloride and subjecting the resulting product to hydrolysis.

(3) The waste materials of polystyrene-based waste resin material may be chloromethylated with chloromethyl ether and the Lewis acids and reacted with ammonia or a variety of amine compounds to introduce tertiary or quaternary amine salts as ion groups into the resin. Alternatively, the polystyrene based waste resin material may be reacted with the chlorometylated product and phosphorus trichloride and the reaction product is hydrolyzed to introduce —PO(OH)2 group into the polystyrene based waste resin material.

(4) By reaction with a liquid mixture of sulfuric acid and nitric acid, —NO2 groups can be introduced into the polymer.

The above-described modification processing may be carried out in alkali or acid or in a system employing an organic solvent.

The solvents used in the reaction system may be enumerated by C1 to control switch 2 aliphatic halogenated hydrocarbons, preferably 1,2-dichloroethane, chloroform, dichloromethane or 1,1-dichloroethane, aliphatic cyclic hydrocarbons, preferably cyclohexane, methyl cyclohexane or cyclopentane, nitromethane, sulfur dioxide, C1 to C7 paraffinic hydrocarbons, acetonitrile, carbon disulfide, tetrahydrofuran, tetrahydropyran, 1,2-dimethoxy ethane, acetone, methylethylketone, and thiophen. Of these, C1 to C2 aliphatic halogenated hydrocarbons, aliphatic cyclic hydrocarbons, nitromethane nitrobenzene and sulfur dioxide are preferred. These solvents may be used alone or in combination. There is no particular limitation to the mixing ratio for the above solvents.

The amount of addition of the organic solvents is preferably less than approximately 200 times the weight of the high-molecular material. If the amount of addition of the organic solvent exceeds this range, the modification processing is non-desirably lowered in reaction ratio.

The alkali, acid or the organic solvent, once used in the modification, may be recovered after the end of the reaction and directly re-used for reaction.

Meanwhile, it is desirable that the high-molecular material as the starting material in the above-described processing with alkali and/or acid be comminuted in particle size. By increasing the surface area of the high-molecular material, the modified portion may be increased to improve the rate of introduction on the ion groups into the high-molecular material.

For comminuting the particle size of the high-molecular material, such as polystyrene based resins, blocks of the high-molecular material may be mechanically pulverized and sieved. If the waste materials are used as the high-molecular material, it is desirable to freeze the waste materials at lower temperature followed by pulverization, because rubber components may be contained in the material.

For comminuting the particle size of the high-molecular material, such as polystyrene based resin, the high-molecular material is preferably of such a piece size as to pass through the mesh not smaller than 3.5 mesh. If the piece size of the high-molecular material is larger than this value, the surface of the reacted product becomes too small to render modification difficult to protract the reaction undesirably. Moreover, the properties of the water-absorbing resin (water-absorbency) are significantly lowered.

In the reaction of introducing the ion groups into the above-mentioned high-molecular material, dispersants may be added to the reaction system when introducing ion groups. This disperses the high-molecular material satisfactorily in the reaction system, thus improving the ionic group introducing rate.

The reaction temperature for the above-described modification is 0 to 200° C. and preferably 30 to 150° C., although it may vary significantly depending on the type of the alkali or acid or on whether an organic solvent is used. If the temperature is too low, the reaction undesirably tends to be retarded. Also, the ion group introducing rate tends to be lowered to render it impossible to realize the good water-absorbing effect. If, conversely, the temperature is too high, the molecular chain of the high-molecular material tends to be disrupted by thermal decomposition, with the resin exhibiting water-solubility and becoming unusable as water-absorbing resin.

The reaction time, which varies significantly with the reaction temperature, is usually 1 minute to 40 hours and preferably 5 minutes to 10 hours. If the reaction is too short or too long, the reaction cannot proceed sufficiently or the production efficiency is worsened.

The reaction product, into which are introduced ion groups by the processing with alkali or acid, is preferably washed in its entirety with a large quantity of water or neutralized with an aqueous solution of opposite properties. Alternatively, the reaction mass may be filtered from the reaction system and injected into a large quantity of water or an aqueous solution of opposite properties for washing. On washing, part of acrylonitrile groups are hydrolyzed such that the reaction product is tuned into acrylamide and improved in hydrophilicity.

The resulting modified product is gelated and hence is dried under the sun, on heating, pressure reduction, centrifugation or press working to provide a desired water-absorbing resin.

By the above-described processing of the second aspect of the present invention, nitrile groups of the acrylonitrile part in the high-molecular material are hydrolyzed into amide groups, carboxylic groups and/or salts thereof. Into the double bonds of the conjugated dienes in the high-molecular material are introduced, on hydrolysis, hydroxyl groups and/or salts thereof or acidic ionic groups. Into the benzene ring of the styrene part are introduced acidic ion groups.

The amide groups, carboxyl groups and/or salts thereof hydroxyl groups and/or salts thereof, are required for improving the absorption for water, such that benzene groups or acidic ion groups introduced into the double bond improve the water absorption properties with respect to the aqueous electrolyte solution. Meanwhile, the cross-linked portion inherently present in the ABS resin is not water-soluble following the above reaction to contribute to formation of the water-absorbing resin having strong gel strength.

The water-absorbing resin thus produced may be used for a variety of usages, such as sanitary articles, including paper diaper or physiological products, materials for construction, agriculture or horticulture, aimed to accord water retention properties to the soil, or for desert afforestation, aroma retention agents for assuring durability of the aromatic agent, dehydrators from organic/inorganic materials, pharmaceuticals for digestion, sealing agents, packing agents, anti-dewing agents, coating agents, desiccants, water processing agents etc.

In the third aspect, the present invention provides a water-absorbing resin wherein an ionic group is introduced into a high-molecular material containing inorganic pigments and/or metal powders and acrylonitrile.

In the high-molecular material containing inorganic and/or organic pigments, the reaction of modification is accelerated since the pigments tend to be disengaged from the surface of the material to render the surface porous to increase the reaction surface. This porous surface is then softened by the activated reaction of modification. Thus, the pigment lying at a deeper site is desorbed from the material to accelerate the reaction of modification.

By the above reason, the reaction of modification of the high-molecular material containing the pigment is accelerated so that the surface of the as-modified high-molecular material is porous to a deep site. Therefore, the water-absorbing resin produced from this high-molecular material is increased in water-absorbing surface and thereby drastically improved in water-absorbing factor and water-absorbing speed.

The content of the inorganic pigment and/or the powdered metal material is 0.01 to 20 wt % and preferably 0.06 to 10 wt %.

If the content of the pigments is small, the modification reaction accelerating effect proper to the high-molecular material is lowered. If conversely the pigment content is excessive, economic demerits are raised, or the modification reaction becomes difficult to control.

The inorganic pigment and the powdered metal material preferably exhibits good dispersion properties with respect to the above-mentioned high-molecular material. Examples of the inorganic pigment and the powdered metal material include carbon black, iron black, titanium oxide, zinc flower, iron oxide red, ultramarine, berlin blue, cobalt blue, lithopone, zinc sulfide, antimony oxide, yellow iron oxide, amber, sienna, ochre, pyridian, aluminum powders and bronze powders. Of these, carbon black and titanium oxide are preferred.

It is noted that carbon black used may be manufactured by any of a channel method, a furnace method and thermal melting method. These methods may be used alone or in combination. The mean particle size is 5 to 500 $\mu$m and preferably 1- to 50 $\mu$m.

Titanium oxide may be of the rutile-, anatase- or long fine particulate titanium type. These different types may be used aline or in combination. The mean particle size is 0.01 to 50 $\mu$m and preferably 0.05 to 10 $\mu$m.

These inorganic pigments or the powdered metal materials may be contained alone or as a mixture in the high-molecular material.

These inorganic pigments or the powdered metal materials may be added to the high-molecular material for preparing the water-absorbing resin and/or as coloring, covering or reinforcing agents or as agents for according electrically conductivity.

In the fourth aspect, the present invention provides a method for manufacturing a water-absorbing resin including processing a high-molecular material containing an inorganic pigment and/or metal powder pigments and acrylonitrile with an alkali and/or an acid to introduce an ionic group.

The ion groups may be added to a high-molecular material containing the inorganic pigments and/or the powdered metal pigments and acrylonitrile by the alkali processing and/or acid processing as described above.

In the fifth aspect, the present invention provides a water-absorbing resin mainly containing a high-molecular material having an ionic group introduced therein and also containing a stabilizer.

It is noted that the high-molecular material, having introduced therein the ion groups as the major portion of the water-absorbing resin of the fifth aspect of the present invention, may be enumerated by (1) acrylic acid, salts thereof, and cross-linked polymers thereof produced by, for example: sodium acrylate+cross-linking agents (cross-linking monomers)→polymerization→drying;

(2) polymers obtained on graft polymerization of starch or polyvinyl alcohol to acrylic acid, salts thereof or acrylonitrile, such as those obtained by
   a. starch+acrylic acid cross-linking agents→graft polymerization→hydrolysis→drying;
   b. starch+acrylonitrile→graft polymerization→hydrolysis→neutralization→drying;

(3) hydrolyzates of acrylic fibers, such as those obtained by the following method:
   acrylonitrile+acrylic acid+N-methylol acrylamide→polymerization→spinning→hydrolysis→drying;

(4) crosslinked polymers of polyvinyl alcohol, such as those obtained by: polyvinyl alcohol→cross-linking (o-phosphoric acid, radiations etc)→drying;

(5) hydrolyzates (acid processed product) of a polymer containing acrylonitrile and, if necessary, styrene or conjugated dienes.

Among a number of stabilizers, there are those having anti-oxidation effect, such as, phenolic, sulfur-based, phosphorus-based stabilizers, erysorbic acid, sodium erysorbate, and isopropyl citrate.

There are also those having light stabilizing effect, such as benzophenone based, benzotriazole-, hindered amine, cyano-acrylate-based, salicylate-based, or oxalic acid anilide base stabilizers.

These stabilizers may be contained alone or as a mixture in the water-absorbing resin. It is noted that plural different stabilizers rather than the same stabilizers, such as antioxidants or light stabilizers, are preferably contained in the water-absorbing resin for assuring stabilizing effects against different factors, such as light or heat.

These stabilizers may be directly added to the high-molecular material containing the above ion groups or previously added to the starting polymer if ion groups are to be introduced. Alternatively, the stabilizers may be added to the water-absorbing resin during manufacture thereof, or added in plural stages described above.

For adding the stabilizers directly to the water-absorbing resin, the stabilizers may be blended individually to the water-absorbing resin, or an aqueous solution in which the stabilizers are dispersed or dissolved in advance may be absorbed to the water-absorbing resin.

For adding the stabilizers at the time of manufacture to a water-absorbing resin obtained on graft polymerization of acrylic acid to starch, the stabilizers may be added to the reaction system following the graft polymerization and neutralization, and the resulting mass may then be dried. If the water-absorbing resin is of the cross-linked sodium acrylate, the stabilizers may be added and dried following polymerization by sodium acrylate and the cross-linking agent. Since the stabilizers tend to capture radicals and hence the stabilizers added prior to polymerization tend to obstruct the polymerization, the stabilizers are preferably added following the polymerization.

The stabilizers are previously added to the starting polymer in the case of the waste ABS resins (if the amount of addition of the stabilizer is insufficient, the deficit stabilizers are to be added newly). These resins are processed with heated sulfuric acid, washed with water and dried to complete the water-absorbing resin.

If the stabilizer is contained in the stating polymer, the high-molecular material containing the stabilizer is hydrolyzed to introduce the ion groups.

Irrespective of the manufacturing methods used, the amount of addition of the stabilizers is preferably 0.00001 to 20 wt % and more preferably 0.0001 to 5 wt % based on the dry weight of the water-absorbing resin. If the amount of addition is smaller than this, the effect of the stabilizer is impaired. If the amount of addition is larger than this, the properties of the water-absorbing resin may be impaired while the cost is undesirably raised.

By adding the stabilizer to the water-absorbing resin product or during manufacture thereof, heating oxidation or photo-oxidation reaction is suppressed to prevent the molecular weight of the water-absorbing resin from being lowered. The result is the water-absorbing resin superior in chronological stability for outdoor use.

In the sixth aspect, the present invention provides a method for manufacturing a water-absorbing resin including introducing a stabilizer into a high-molecular material into which is previously introduced an ionic group, or hydrolyzing a stabilizer-containing high-molecular material to introduce an ionic group.

The ion groups can be introduced into the high-molecular material by the acid processing and/or alkali processing such as those described above.

DESCRIPTION OF THE PREFERRED EMBODIMENTS

The first and second embodiments of the present invention will be explained in detail.

EXAMPLE 1

An ABS resin, containing, as constituent units, 44 mol % of styrene units, 29 mol % of acrylonitrile units and 28 mol % of butadiene unit, with 1 wt % of titanium oxide as an inorganic pigment, was freeze-pulverized to a pulverized product with 32 to 150 mesh size. 3 g of the pulverized product were added to 90 g of 96 wt % sulfuric acid and reacted at 80° C. for five minutes. After the end of the reaction, a solidified product in the reaction system was filtered through a glass filter, washed with water and dried by a circulating type drier at 115° C. for two hours to give a water-absorbing resin (Example 1).

The sulfonic acid groups in the water-absorbing resin (Example 1) accounted for 35 mol % of the entire monomer unit.

EXAMPLE 2

A used guard panel of the 8 mm cassette tape (black-colored portion), formed of a waste ABS resin containing, as constituent units, 50 mol % of styrene units, 35 mol % of acrylonitrile units, 15 mol % of butadiene unit and 1 wt % of carbon black, was pulverized to a size of 32 to 150 mesh.

3 g of the pulverized product was added to 90 g of 89 wt % concentrated sulfuric acid and reacted at 60° C. for 20 minutes. The reaction system was then cooled to ambient temperature and added to with 0.5 g of 60 wt % fuming sulfuric acid to continue the reaction for further ten minutes. After the end of the reaction, the solid product was filtered by a glass filter, washed with water and dried for two hours by a direr to a water-absorbing resin (Example 2).

The sulfonic acid groups in the water-absorbing resin (Example 2) accounted for 45 mol % of the entire monomer unit.

EXAMPLE 3

The pulverized ABS resin of Example 1 was added to a 5 wt % of an aqueous solution and reacted at 95° C. for one hour. After the end of the reaction, the solid mass in the reaction system was filtered, washed with water and dried for two hours in a drier to a water-absorbing resin (Example 3).

The sulfonic acid groups in the water-absorbing resin (Example 3) accounted for 25 mol % of the entire monomer unit.

EXAMPLE 4

The ABS resin of the same resin composition as Example 1, not containing titanium oxide (natural type), was freeze-dried to a 32 to 150 mesh pulverized product, which then was processed in the same manner as in Example 1 to give a water-absorbing resin (Example 4).

The sulfonic acid groups in the water-absorbing resin (Example 4) accounted for 20 mol % of the entire monomer unit.

COMPARATIVE EXAMPLE 1

A water-absorbing resin (Comparative Example 1) was produced in the same way as in Example 1 except using a SAN resin reagent (containing, as constituent units, 60 mol % of styrene unit and 40 mol % of acrylonitrile unit, and not containing the pigment) as a starting material.

The sulfonic acid group of the water-absorbing resin (Comparative Example 1) accounted for 12 mol % of the entire monomer unit.

COMPARATIVE EXAMPLE 2

A water-absorbing resin (Comparative Example 2) was produced in the same way as in Example 1 except using a HIPS resin reagent (containing 60 mol % of a styrene unit and 40 mol % of a butadiene unit without containing pigments) as a starting material to give a water-absorbing resin (Comparative Example 2).

The sulfonic acid groups in this water-absorbing resin (Comparative Example 2) accounted for 9 mol % of the entire monomer unit.

COMPARATIVE EXAMPLE 3

A water-absorbing resin (Comparative Example 3) was produced in the same way as in Example 1 except using NBR reagent (containing 22 mol % of acrylonitrile unit and 78 mol % of butadiene unit without containing pigments) as a starting material to give a water-absorbing resin (Comparative Example 3).

The sulfonic acid groups in this water-absorbing resin (Comparative Example 3) accounted for 14 mol % of the entire monomer unit.

COMPARATIVE EXAMPLE 4

A water-absorbing resin (Comparative Example 4) was produced in the same way as in Example 2 except using the SAN resin of Comparative Example 1 to give a water-absorbing resin (Comparative Example 4).

The sulfonic acid groups in this water-absorbing resin (Comparative Example 4) accounted for 14 mol % of the entire monomer unit.

COMPARATIVE EXAMPLE 5

A water-absorbing resin (Comparative Example 5) was produced in the same way as in Example 3 except using the SAN resin of Comparative Example 1 to give a water-absorbing resin (Comparative Example 5).

The sodium carbonade group in the water-absorbing resin (Comparative Example 5) accounted for 10% of the entire monomer unit.

Evaluation of Properties 1

The water absorption properties of the water-absorbing resins of the Examples 1 to 4 and the Comparative Examples 1 to 5 were checked in the following manner.

Each 1 g of the water-absorbing resins of the Examples and Comparative Examples was dipped in pure water to check the weight after lapse of one minute, two minutes and four minutes. The results are shown in Table 1.

TABLE 1

| | weight (g) | | |
|---|---|---|---|
| | after lapse of 1 minute | after lapse of 2 minutes | after lapse of 4 minutes |
| Ex. 1 | 98 | 97 | 101 |
| Ex. 2 | 109 | 110 | 111 |

TABLE 1-continued

| | weight (g) | | |
|---|---|---|---|
| | after lapse of 1 minute | after lapse of 2 minutes | after lapse of 4 minutes |
| Ex. 3 | 90 | 95 | 93 |
| Ex. 4 | 51 | 65 | 66 |
| Comp. Ex. 1 | 39 | 50 | 51 |
| Comp. Ex. 2 | 1.1 | 1.1 | 1.1 |
| Comp. Ex. 3 | 2.1 | 3.1 | 3.1 |
| Comp. Ex. 4 | 32 | 47 | 48 |
| Comp. Ex. 5 | 23 | 34 | 34 |

From the results of table 1, the water-absorbing resins containing all three units of styrene, acrylonitrile and conjugated diene (Examples 1 to 4) are superior in both the water-absorbing rate and in water-absorbing factor as compared to the water-absorbing resins not containing all these three units (Comparative Examples 1 to 5).

As may be seen on comparing the results of Examples and 4, the water-absorbing rate and the water-absorbing factor may be further improved by further containing an inorganic pigment.

Up to now, the waste ABS resin materials can hardly be re-used because the resin composition is varied from one product to another and the properties are drastically lowered on re-melting. According to the present invention, the waste ABS resin can be used as a starting material to render it possible to make more effective utilization of resources.

Evaluation of Properties 2

The water absorption properties of the water-absorbing resins of the Examples 1 to 4 and the Comparative Examples 1 to 5 were checked in the following manner.

Each 1 g of the water-absorbing resins of the Examples and Comparative Examples was dipped in 1 wt % of calcium chloride to check the weight after lapse of one minute, two minutes and four minutes. The results are shown in Table 2.

TABLE 2

| | Weight (g) | | |
|---|---|---|---|
| | after lapse of one minute | after lapse of two minutes | After lapse of three minutes |
| Ex. 1 | 46 | 47 | 47 |
| Ex. 2 | 53 | 55 | 55 |
| Ex. 3 | 32 | 38 | 38 |
| Ex. 4 | 18 | 2 | 22 |
| Comp. Ex. 1 | 12 | 17 | 18 |
| Comp. Ex. 4 | 15 | 20 | 21 |
| Comp. Ex. 5 | 3 | 5 | 5 |

From the results of table 2, the water-absorbing resins containing all three units of styrene, acrylonitrile and conjugated diene (Examples 1 to 4) are superior in water absorption properties with respect to the artificial urine and an aqueous electrolytic solution (aqueous solution of divalent metal salts) as compared to the water-absorbing resins containing none of these three units (Comparative Examples 1, 4 and 5).

As may be seen on comparing the results of Examples 1 and 4, the water-absorbing rate and the water-absorbing factor may be further improved by further containing an inorganic pigment.

The third and fourth embodiments of the present invention are hereinafter explained with reference to further illustrative embodiments.

EXAMPLE 5

An ABS resin containing, as constituent units, 52 mol % of a styrene unit, 29 mol % of an acrylonitrile unit and 19 mol % of a butadiene unit, and also containing 1 wt % of carbon black, was freeze-pulverized to a mesh size of 16 to 65 mesh. 3 g of this pulverized product was added to 90 g of 89 wt % concentrated sulfuric acid and reacted at 80° C. for 20 minutes. After the end of the reaction, the solid substance in the reaction system was filtered through a glass filter, washed with water and dried in a circulating type drier at 115° C. for two hours to give a black colored water-absorbing resin (Example 5).

The sulfonic acid groups in this water-absorbing resin (Example 1) accounted for 42 mol % of the entire monomer unit.

EXAMPLE 6

A used guard panel of the 8 mm cassette tape (transparent portion), formed of a waste SAN resin containing, as constituent units, 64 mol % of styrene units and 36 mol % of acrylonitrile units, without containing inorganic pigments, was pulverized to particle size of 16 to 65 mesh. To this pulverized product were added 2 wt % of titanium oxide powers and kneaded using a small-sized extruder at 250°.

3 g of the pulverized product was added to 90 g of 96 wt % concentrated sulfuric acid and reacted at 60° C. for 60 minutes. The reaction product was allowed to cool to room temperature and added to with 0.5 g of 60 wt % fuming sulfuric acid. The reaction was continued further for 30 minutes. After the end of the reaction, the solid mass in the reaction system was filtered through a glass filter, washed with water and dried by a drier for two hours. A pale yellow water-absorbing resin (Example 6) was obtained.

The sulfonic acid groups in this water-absorbing resin (Example 6) accounted for 51 mol % of the entire monomeric unit.

EXAMPLE 7

The procedure of Example 1 was followed except using a casing of a used personal computer (waste ABS material containing, as constituting units, 46 mol % of a styrene unit, 36 mol % of acrylonitrile unit and 19 mol % of a butadiene unit, and also containing 1 wt % of carbon black, as inorganic pigment). A black water-absorbing resin (Example 7) was obtained.

The sulfonic acid groups in this water-absorbing resin (Example 7) accounted for 38 mol % of the entire monomeric unit.

EXAMPLE 8

The pulverized ABS resin, which is the same starting material as that of Example 5, was added to a 7 wt % aqueous solution of sodium hydroxide, and reaction was carried out at 98° C. for two hours. After the end of the reaction, the solid mass in the reaction system was filtered, washed with water and filtered for two hours in a drier. A black water-absorbing resin (Example 8) was produced.

The sodium carboxylate in the water-absorbing resin (Example 8) accounted for 34 mol % of the entire monomer unit.

COMPARATIVE EXAMPLE 6

An ABS resin (natural type) having the same resin composition as that of Example 6 and not containing pigments (carbon black) was freeze-dried to the size of 16 to 65 mesh. This pulverized product was processed in the same way as in Example 5 to produce a pale orange colored water-absorbing resin (Comparative Example 6).

The sulfonic acid groups in the water-absorbing resin (Comparative Example 6) accounted for 27 mol % of the entire monomer unit.

COMPARATIVE EXAMPLE 7

The processing was carried out in the same manner as in Example 2, except not adding titanium oxide, to produce a transparent water-absorbing resin (Comparative Example 7).

The sulfonic acid groups in the water-absorbing resin (Comparative Example 7) accounted for 27 mol % of the entire monomer unit.33

COMPARATIVE EXAMPLE 8

An ABS resin (natural type) having the same resin composition as that of Example 5 and not containing pigments (carbon black) was freeze-dried to the size of 16 to 65 mesh. This pulverized product was processed in the same way as in Example 4 to produce a yellow water-absorbing resin (Comparative Example 8).

The sodium carboxylate groups in the water-absorbing resin (Comparative Example 8) accounted for 22 mol % of the entire monomer unit.

Evaluation of Properties 3

The water absorption properties of the water-absorbing resins of the Examples 5 to 8 and the Comparative Examples 6 to 8 were checked in the following manner.

Each 1 g of the water-absorbing resins of the Examples and Comparative Examples was dipped in pure water to check the weight after lapse of 30 seconds, two minutes and five minutes. The results are shown in Table 3.

TABLE 3

| | wt. (g) | | |
|---|---|---|---|
| | after lapse of 30 seconds | after lapse of two minutes | after lapse of four minutes |
| Ex. 5 | 105 | 110 | 112 |
| Ex. 6 | 84 | 90 | 81 |
| Ex. 7 | 98 | 102 | 102 |
| Ex. 8 | 80 | 82 | 85 |
| Comp. Ex. 6 | 53 | 68 | 72 |
| Comp. Ex. 7 | 47 | 58 | 61 |
| Comp. Ex. 8 | 42 | 50 | 52 |

From the results of Table 3, it is seen that the water-absorbing resin containing an inorganic pigment (Examples 5 to 8) is superior in water-absorbing rate and water-absorbing factor as compared to the water-absorbing resin not containing inorganic pigments (Comparative Examples 6 to 8).

It is also seen that, by the application of the manufacturing method of the present invention, the water-absorbing resin employing the waste ABS resin having substantially the same composition as that of Example 5 (the resin of Example 8) shows superior water-absorbing rate and water-absorbing factor.

Evaluation of Properties 4

Of the water-absorbing resins of the Examples 5 to 8 and Comparative Examples 6 to 8, the water-absorbing properties were checked in the following manner.

Each 1 g of the Examples and Comparative Examples was dipped in artificial urea and 1 wt % of calcium chloride to measure the weight after lapse of five minutes. The results are shown in Table 4.

TABLE 4

| | weight (g) | |
|---|---|---|
| | artificial urine | calcium chloride |
| Ex. 5 | 69 | 44 |
| Ex. 6 | 53 | 35 |
| Ex. 7 | 63 | 40 |
| Ex. 8 | 50 | 32 |
| Comp. Ex. 6 | 44 | 22 |
| Comp. Ex. 7 | 40 | 20 |
| Comp. Ex. 8 | 33 | 17 |

From the results of Table 4, it is seen that the water-absorbing resin containing an inorganic pigment (Examples 5 to 8) is superior in water-absorbing properties for the artificial urine or aqueous electrolytic solutions (aqueous solutions of divalent metal salts) as compared to the water-absorbing resin not containing inorganic pigments (Comparative Examples 6 to 8).

It is also seen that, by the application of the manufacturing method of the present invention, the water-absorbing resin employing the waste ABS resin having substantially the same composition as that of Example 5 (the resin of Example 8) exhibit superior water absorption properties.

The fifth and sixth aspects of the present invention are hereinafter explained.

EXAMPLE 9

A casing of a used personal computer, formed of a waste ABS material containing, as a resin composition, 48 mol % of a styrene unit, 39 mol % of acrylonitrile unit and 13 mol % of a butadiene unit, and also containing 0.2 wt % of stearyl-β-(3,5-di-t-butyl-4-hydroxy phenyl)propionate, a stabilizer, was freeze-pulverized to a pulverized resin material of 32 to 65 mesh size.

3 g of this pulverized product was added to 90 g of concentrated sulfuric acid (concentration: 96 wt %) and reacted at 80° C. for 20 minutes. After the end of the reaction, a solid product in the reaction system was filtered through a glass filter, washed with water and dried by a circulating type drier at 115° C. for two hours.

A black water-absorbing resin was obtained.

The sulfonic acid groups in the water-absorbing resin accounted for 38 mol % of the entire monomer unit, with the content of the stabilizer being 0.012 wt % on the dry weight basis.

EXAMPLE 10

A guard panel (transparent portion) of a used 8 mm cassette tape, formed of a waste SAN resin containing, as a resin composition, 64 mol % of a styrene unit and 36 wt % of an acrylonitrile unit, and also containing, as stabilizers, 0.2 wt % of tetrakis (2,2,6,6-tetramethyl-4-piperidyl-1,3,4-butane tetracarboxylate and 0.1 wt % of stearyl-β-(3,5-di-butyl-4-hydroxy phenyl)propionate, was pulverized to a resin product having a mesh size of 32 to 65.

3.5 g of this pulverized product were added to 90 g of concentrated sulfuric acid having a concentration of 89 wt % and reacted at 60° C. for 60 minutes. 0.5 g of fuming sulfuric acid, containing 60 wt % of SO3, was added to the reaction system and reacted further for 30 minutes.

After the end of the reaction, the solid mass in the reaction system was filtered through a glass filter, washed with water and dried by a drier for two hours. A transparent water-absorbing resin was produced.

The sulfonic groups in the water-absorbing resin (Example 10) accounted for 47 mol % of the entire monomer unit. The content of the former stabilizer was 0.01 wt %, while that of the latter stabilizer was 0.008 wt %, on the dry weight basis.

EXAMPLE 11

Starch was α-processed and charged so that the starch to acrylic acid ratio was 20/80 wt %, with the polymerization concentration being 20 wt %, and polymerization was carried out using a redox catalyst (H2O2 catalyst: 0.1 mol %).

After the end of the polymerisation, 70 mol % of the polyacrylic acid fraction was neutralized with sodium hydroxide and sodium erysorbate was kneaded into a polymer gel in an amount of 0.01 wt % based on the pure polymer content.

The resulting product was dried by a drier to produce a stabilizer-containing water-absorbing resin.

EXAMPLE 12

In 1 g of a commercial cross-linked sodium polyacrylate water-absorbing resin were absorbed 5 g of a 0.001 wt % aqueous solution of 1,1,3-tris(2-methyl-4-hydroxy-5-t-butylphenyl)butane and subsequently dried to give a stabilizer-containing water-absorbing resin.

EXAMPLE 13

In 1 g of a commercial polyvinyl cross-linked water-absorbing resin were absorbed 2 g of 0.002 wt % ethanolic solution of phenyl salicylate and subsequently dried to give a stabilizer-containing water-absorbing resin.

COMPARATIVE EXAMPLE 9

A SAN reagent resin, containing 60 mol % of styrene and 40 mol % of acrylonitrile without containing a stabilizer was pulverized and classified to recover a solid article of 32 to 65 mesh size.

This solid mass was processed in the similar manner to Example 10 to produce a transparent water-absorbing resin. The sulfonic acid groups in the water-absorbing resin accounted for 44 mol % of the entire monomer unit. This water-absorbing resin was termed a resin of Comparative Example 9.

COMPARATIVE EXAMPLE 10

A commercial starch/sodium acrylate graft water-absorbing resin was termed a resin of Comparative Example 10.

COMPARATIVE EXAMPLE 11

A commercial cross-linked sodium polyacrylate water-absorbing resin was termed a resin of Comparative Example 11.

COMPARATIVE EXAMPLE 12

A commercial polyvinyl alcohol cross-linked water-absorbing resin was termed a resin of Comparative Example 12.

Of the above water-absorbing resins of the Examples 9 to 13 and the Comparative Examples 9 to 12, chronological stability was evaluated by the following method:

Evaluation 5

The above water-absorbing resins and the same resins swollen to a volume 50 times the original volume were heated and dried in an oven at 90° C. for 100 hours.

After this heating processing, changes in the water-absorbing factor relative to pure water (rate of decrease of the water-absorbing efficiency)[(water-absorbing factor after heating processing/water-absorbing factor before heating)×100(%)] were measured and compared. The results are shown in Table 5.

TABLE 5

| samples | only water-absorbing resin | swollen water-absorbing resin |
| --- | --- | --- |
| Ex. 9 | >95% | >95% |
| Ex. 10 | 92% | 88% |
| Ex. 11 | 78% | 70% |
| Ex. 12 | 72% | 64% |
| Ex. 13 | 82% | 75% |
| Comp. Ex. 9 | 42% | 33% |
| Comp. Ex. 10 | <10% | <10% |
| Comp. Ex. 11 | <10% | <19% |
| Comp. Ex. 12 | 18% | <10% |

It is seen from this Table 5 that the inventive Examples 9 to 13 show chronological stability with respect to heat superior to those of the Comparative Example 9 to 12.

Evaluation 6

The above water-absorbing resins and the same resins swollen to a volume 50 times the original volume were irradiated for 50 hours with a 15 W/100 V lamp spaced 50 cm from the resins.

The resins obtained after irradiation and those not irradiated were dried under the same conditions of 90° C. two hours and the difference of the water-absorption factor of the produced resins to pure water[(irradiated products/non-irradiated products)×100 (%)] was measured and compared. The results are shown in Table 6.

| samples | only water-absorbing resin | swollen water-absorbing resin |
| --- | --- | --- |
| Ex. 9 | 94% | 95% |
| Ex. 10 | 87% | 89% |
| Ex. 11 | 85% | 83% |
| Ex. 12 | 82% | 80% |
| Ex. 13 | 83% | 80% |
| Comp. Ex. 9 | 58% | 60% |
| Comp. Ex. 10 | 49% | 44% |
| Comp. Ex. 11 | 21% | 18% |
| Comp. Ex. 12 | 22% | 20% |

It is seen from table 6 that the inventive Examples 9 to 13 are superior in chronological stability to light superior to the Comparative Example 9 to 12.

What is claimed is:

1. A water-absorbing resin absorbing high amounts of water obtained by introducing an ionic group into a high-molecular weight material, the high-molecular weight material consisting essentially of the ionic group, 25 to 40 mol % acrylonitrile, 40 to 60 mol % styrene and 10 to 30 mol % of conjugate diene as constituent units, and wherein the ionic group is present in an amount of 5 to 95 mol % based on an entire unit of the high-molecular weight material, and wherein said ionic group comprises at least one selected from the group consisting of a sulfonic acid group and/or its salt, an amide group, a carboxylic acid and/or its salt, a PO(OH)2 group and/or its salt, a —CH2PO(OH)2 group and/or its salt, a NO2, a hydroxy group and/or its salt, or a chloromethylated amine group and/or its salt.

2. The water-absorbing resin according to claim 1 wherein the conjugated diene in said high-molecular weight material is in the form of a block copolymer.

3. The water-absorbing resin according to claim 1 wherein the high-molecular weight material is an acrylonitrile-butadiene-styrene resin.

4. The water-absorbing resin according to claim 1 wherein the high-molecular weight material is a waste material comprised of a used resin molded for specified usage.

5. The water-absorbing resin according to claim 1 wherein said inorganic pigment and/or the powdered metal pigments are selected from the group consisting of carbon black, iron black, titanium oxide, zinc flower, iron oxide red, ultramarine, berlin blue, cobalt blue, lithopone, zinc sulfide, antimony oxide, yellow iron oxide, amber, sienna, ochre, pyridian, aluminum powders, bronze powders and mixtures thereof.

6. The water-absorbing resin according to claim 1 wherein introduction of said ionic group is by introducing an acidic group and/or hydrolysis.

7. A water-absorbing resin absorbing high amounts of water wherein an ionic group is introduced in to a high-molecular weight material with 0.01 to 20 wt % inorganic pigments and/or metal powders, the high-molecular weight material consisting essentially of the ionic group, 25 to 40 mol % acrylonitrile, 40 to 60 mol % styrene and 10 to 30 mol % conjugated diene, and wherein the inorganic group is present in an amount of 5 to 95 mol % based upon an entire unit of the high-molecular weight material, and wherein said ionic group comprises at least one selected from the group consisting of a sulfonic acid group and/or its salt, an amide group, a carboxylic acid and/or its salt, a PO(OH)2 group and/or its salt, a —CH2PO(OH)2 group and/or its salt, a NO2, a hydroxy group and/or its salt, or a chloromethylated amine group and/or its salt.

8. The water-absorbing resin according to claim 7 wherein said inorganic pigment and/or the powdered metal pigments are at least one of carbon black, iron black, titanium oxide, zinc flower, iron oxide red, ultramarine, berlin blue, cobalt blue, lithopone, zinc sulfide, antimony oxide, yellow iron oxide, amber, sienna, ochre, pyridian, aluminum powders or bronze powders.

9. The water-absorbing resin according to claim 7 wherein the high-molecular weight material is a waste material comprised of a used resin molded for specified usage.

10. A water-absorbing resin absorbing high amounts of water mainly containing a high-molecular weight material having an ionic group introduced therein and also containing a stabilizer, the high-molecular weight material consisting essentially of the ionic group, 25 to 40 mol % acrylonitrile, 40 to 60 mol % styrene and 10 to 30 mol % conjugated diene as constituent units, and wherein the ionic group is present in an amount of 5 to 95 mol % based upon an entire unit of the high-molecular weight material, and wherein said ionic group comprises at least one selected from the group consisting of a sulfonic acid group and/or its salt, an amide group, a carboxylic acid and/or its salt, a PO(OH)2 group and/or its salt, a —CH2PO(OH)2 group and/or its salt, a NO2, a hydroxy group and/or its salt, or a chloromethylated amine group and/or its salt.

11. The water-absorbing resin according to claim 10 wherein the content of said stabilizer on the dry weight basis is 0.00001 to 20 wt %.

12. The water-absorbing resin according to claim 10 wherein said stabilizer is selected from the group consisting of a phenolic anti-oxidant, a sulfur-based anti-oxidant and a phosphorus-based anti-oxidant.

13. The water-absorbing resin according to claim 10 wherein said stabilizer is selected from the group consisting of erysorbic acid, sodium erysorbate and isopropyl citrate.

14. The water-absorbing resin according to claim 10 wherein said stabilizer is selected from the group consisting of a benzophenone based light stabilizer, a benzotriazole based light stabilizer, a hindered amine based light stabilizer, a cyano-acrylate based light stabilizer, a salicylate based light stabilizer or an oxalic acid anilide based light stabilizer.

15. The water absorbing resin according to claim 12 wherein the polymer containing acrylonitrile as the constituent unit is selected from the group consisting of polyacrylonitrile, an acrylonitrile-butadiene-styrene resin, a styrene-acrylonitrile resin and acrylonitrile-butadiene rubber.

* * * * *